US008620169B2

(12) United States Patent
Harashima et al.

(10) Patent No.: US 8,620,169 B2
(45) Date of Patent: Dec. 31, 2013

(54) IMAGE FORMING APPARATUS

(75) Inventors: Yasumitsu Harashima, Kanagawa (JP); Takaharu Nakajima, Kanagawa (JP); Masaya Nakatsuhara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 111 days.

(21) Appl. No.: 13/410,730

(22) Filed: Mar. 2, 2012

(65) Prior Publication Data

US 2013/0051823 A1 Feb. 28, 2013

(30) Foreign Application Priority Data

Aug. 24, 2011 (JP) ................................ 2011-182605

(51) Int. Cl.
*G03G 15/00* (2006.01)
*B41J 29/393* (2006.01)
*G06K 15/00* (2006.01)

(52) U.S. Cl.
USPC ................ 399/38; 399/49; 399/400; 347/19; 347/104; 358/1.2; 358/1.9

(58) Field of Classification Search
USPC ................................ 399/38, 49, 400; 347/19
See application file for complete search history.

(56) References Cited

U.S. PATENT DOCUMENTS 7,421,221 B2 * 9/2008 Suzuki ........................... 399/49
8,280,297 B2 * 10/2012 No et al. ...................... 399/400
2005/0024417 A1 * 2/2005 Ogasawara .................... 347/19
2005/0099644 A1 * 5/2005 Nomoto et al. .............. 358/1.12
2007/0189789 A1 * 8/2007 Suzuki ........................... 399/49
2010/0245514 A1 * 9/2010 Kaimoto et al. .............. 347/104
2011/0001785 A1 * 1/2011 Tsuzawa et al. .............. 347/104
2012/0189329 A1 * 7/2012 Tamaki et al. ................. 399/38

FOREIGN PATENT DOCUMENTS

JP 2006071803 A * 3/2006
JP 2009-198682 A 9/2009
JP 2009198682 A * 9/2009

* cited by examiner

*Primary Examiner* — David Gray
*Assistant Examiner* — Francis Gray
(74) *Attorney, Agent, or Firm* — Sughrue Mion, PLLC

(57) ABSTRACT

An image forming apparatus includes a transport member that transports a recording medium, an image carrier that carries a toner image, a transfer member that transfers the toner image onto the recording medium, a fixing device that fixes the toner image, a reversing path that reverses the recording medium, and a controller. When the toner image is a borderless image and there is a burr on an edge portion of the recording medium, the controller controls the transport member, the image carrier, and the transfer member so that the recording medium passes between the image carrier and the transfer member and through the fixing device without the toner image being transferred onto the recording medium, and then the recording medium is transported along the reversing path to between the image carrier and the transfer member and the toner image is transferred onto the recording medium.

8 Claims, 7 Drawing Sheets

IMAGE FORMING APPARATUS

CROSS-REFERENCE TO RELATED APPLICATIONS

This application is based on and claims priority under 35 USC 119 from Japanese Patent Application No. 2011-182605 filed Aug. 24, 2011.

BACKGROUND

The present invention relates to an image forming apparatus.

SUMMARY

According to an aspect of the invention, there is provided an image forming apparatus including a transport member that transports a recording medium, an image carrier that rotates while carrying a toner image on a surface thereof, a transfer member that transfers the toner image carried by the image carrier onto the recording medium by causing the recording medium, which is transported by the transport member, to pass between the transfer member and the image carrier while the transfer member is in contact with the image carrier so as to be rotated by the image carrier, a fixing device that is disposed downstream of the image carrier in a transport direction of the recording medium and that fixes the toner image to the recording medium by nipping the recording medium onto which the toner image has been transferred, a reversing path that reverses front and back sides of the recording medium that has passed between the image carrier and the transfer member and through the fixing device and then guides the recording medium to between the image carrier and the transfer member, and a controller. When the toner image to be transferred onto the recording medium is a borderless image and there is a burr on an edge portion of the recording medium, the controller controls the transport member, the image carrier, and the transfer member so that the recording medium passes between the image carrier and the transfer member and through the fixing device without the toner image being transferred onto the recording medium, and then the recording medium is transported along the reversing path to between the image carrier and the transfer member and the toner image is transferred onto the recording medium.

BRIEF DESCRIPTION OF THE DRAWINGS

Exemplary embodiments of the present invention will be described in detail based on the following figures, wherein.

DETAILED DESCRIPTION

An example of an image forming apparatus 10 according to a first exemplary embodiment of the present invention will now be described with reference to FIGS. 1 to 4.

Overall Structure

Figure 4:
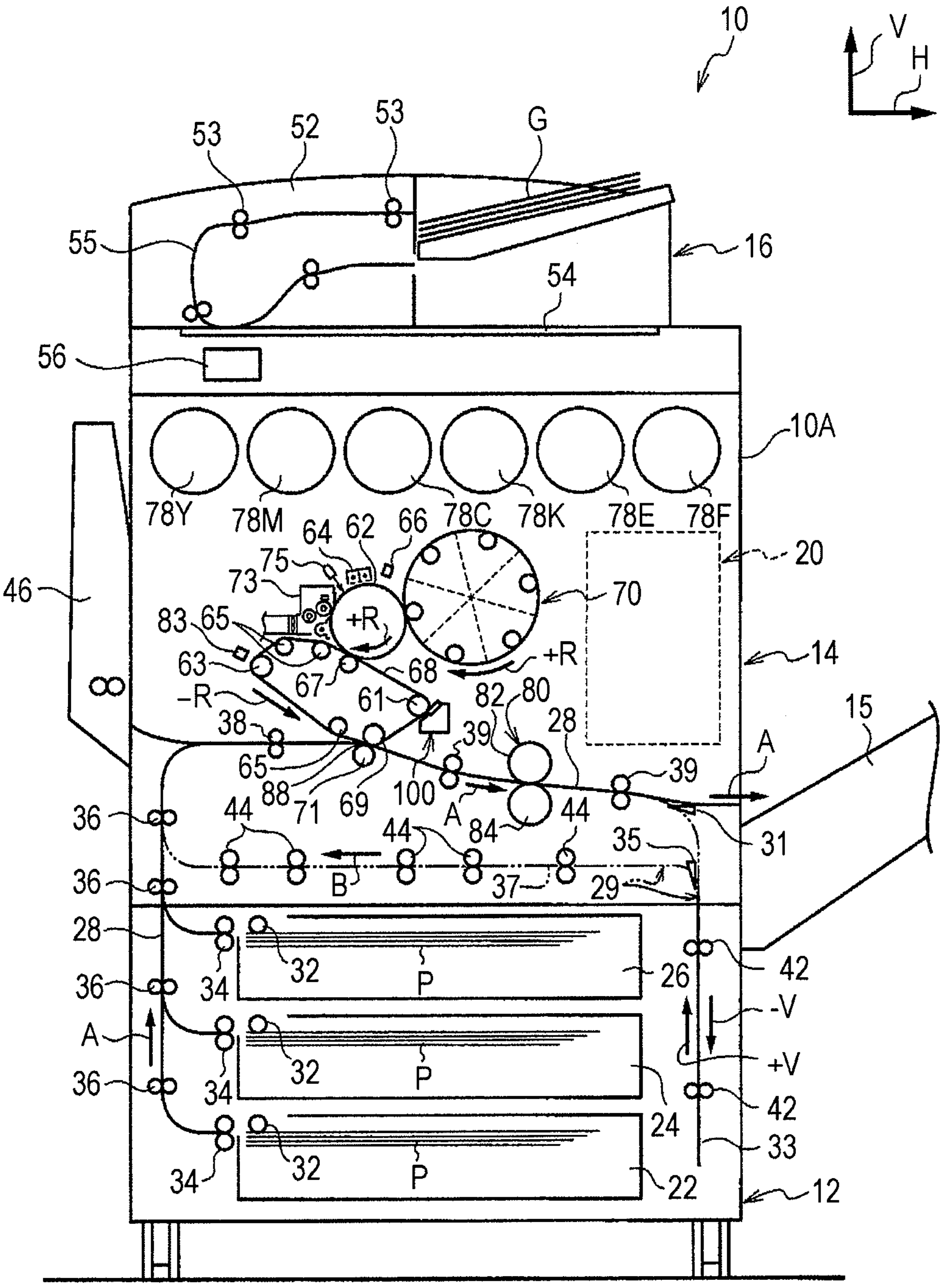
FIG. 4 illustrates the image forming apparatus according to the first exemplary embodiment of the present invention.

Referring to FIG. 4, the image forming apparatus 10 according to the present exemplary embodiment includes, in order from bottom to top in the vertical direction (direction of arrow V), a storage unit 12 in which sheet members P, which serve as recording media, are stored; an image forming unit 14 which is located above the storage unit 12 and forms images on the sheet members P fed from the storage unit 12; and an original-document reading unit 16 which is located above the image forming unit 14 and reads an original document G. The image forming apparatus 10 also includes a controller 20 that is provided in the image forming unit 14 and controls the operation of each part of the image forming apparatus 10. In the following description, the vertical direction (direction of arrow V) and the horizontal direction (direction of arrow H in FIG. 4) of an apparatus body 10A of the image forming apparatus 10 are simply referred to as the vertical direction and the horizontal direction, respectively.

The storage unit 12 includes a first storage unit 22, a second storage unit 24, and a third storage unit 26 in which the sheet members P having different sizes are stored. Each of the first storage unit 22, the second storage unit 24, and the third storage unit 26 is provided with a feeding roller 32 that feeds the stored sheet members P to a transport path 28 provided in the image forming apparatus 10. Pairs of transport rollers 34 and 36, which are examples of transport members for transporting the sheet members P one at a time, are provided along the transport path 28 at the downstream side of each feeding roller 32 in the transport direction of the sheet members P (hereinafter referred to simply as the downstream side in the transport direction). A pair of positioning rollers 38, which are examples of transport members, are provided on the transport path 28 at a position downstream of the transport rollers 36 in the transport direction. The positioning rollers 38 temporarily stop each sheet member P and feed the sheet member P toward a second transfer position 88, which will be described below, at a predetermined timing.

In a front view of the image forming apparatus 10, a downstream part of the transport path 28, which is provided in a lower section of the image forming unit 14, extends from the lower left part of the image forming unit 14 to a paper output unit 15 provided on the right side of the image forming unit 14. A duplex-printing transport path 29, which is an example of a reversing path for reversing and transporting each sheet member P in a process of forming images on both sides of the sheet member P, is connected to the transport path 28.

In the front view of the image forming apparatus 10, the duplex-printing transport path 29 includes a first switching member 31, a reversing unit 33, a transport unit 37, and a second switching member 35. The first switching member 31 switches between the transport path 28 and the duplex-printing transport path 29. The reversing unit 33 extends linearly in the vertical direction from a lower right part of the image forming unit 14 along the right side of the storage unit 12. The transport unit 37 receives the trailing end of each sheet member P that has been transported to the reversing unit 33 and transports the sheet in the horizontal direction. The second switching member 35 switches between the reversing unit 33 and the transport unit 37. The reversing unit 33 includes plural pairs of transport rollers 42 that are arranged with intervals therebetween, and the transport unit 37 includes plural pairs of transport rollers 44 that are arranged with intervals therebetween. The transport rollers 42 and 44 are examples of transport members.

The first switching member 31 has the shape of a triangular prism, and a point end of the first switching member 31 is moved by a driving unit (not shown) to one of the transport path 28 and the duplex-printing transport path 29. Thus, the transport direction of each sheet member P is changed. Similarly, the second switching member 35 has the shape of a triangular prism, and a point end of the second switching member 35 is moved by a driving unit (not shown) to one of the reversing unit 33 and the transport unit 37. Thus, the transport direction of each sheet member P is changed. The downstream end of the transport unit 37 in the transport direction is connected to the transport path 28 by a guiding member (not shown).

A foldable manual sheet-feeding unit 46 is provided on the wall surface of the image forming unit 14 at the left side thereof. The manual sheet-feeding unit 46 is connected to the transport path 28 at a position in front of the positioning rollers 38.

The original-document reading unit 16 located in the upper section of the image forming apparatus 10 includes a document transport device 52 that automatically transports sheets of the original document G one at a time; a platen glass 54 which is located below the document transport device 52 and on which the sheets of the original document G are placed one at a time; and an original-document reading device 56 that scans each sheet of the original document G while the sheet is being transported by the document transport device 52 or placed on the platen glass 54.

The document transport device 52 includes an automatic transport path 55 along which pairs of transport rollers 53 are arranged. A part of the automatic transport path 55 is arranged such that each sheet of the original document G moves along the top surface of the platen glass 54. The original-document reading device 56 scans each sheet of the original document G that is being transported by the document transport device 52 while being stationary at the left edge of the platen glass 54. Alternatively, the original-document reading device 56 scans each sheet of the original document G placed on the platen glass 54 while moving in the horizontal direction.

The image forming unit 14 is disposed below the original-document reading unit 16 and includes a cylindrical photoconductor 62 that is located in a central area of the apparatus body 10A of the image forming apparatus 10. A toner image is formed on the surface of the photoconductor 62. The photoconductor 62 is rotated in the direction shown by arrow +R (clockwise in FIG. 4) by a driving unit (not shown), and carries an electrostatic latent image formed by irradiation with light. In addition, a scorotron charging member 64 that charges the surface of the photoconductor 62 is provided above the photoconductor 62 so as to face the surface of the photoconductor 62.

An exposure device 66 is provided so as to face the surface of the photoconductor 62 at a position downstream of the charging member 64 in the rotational direction of the photoconductor 62. The exposure device 66 includes a light emitting diode (LED). The surface of the photoconductor 62 that has been charged by the charging member 64 is irradiated with light (exposed to light) by the exposure device 66 on the basis of an image signal corresponding to each color of toner. Thus, an electrostatic latent image is formed. The exposure device 66 is not limited to those including LEDs. For example, the exposure device 66 may be structured such that the surface of the photoconductor 62 is scanned with a laser beam by using a polygon mirror.

A rotation-switching developing device 70 is provided downstream of a position where the photoconductor 62 is irradiated with exposure light by the exposure device 66 in the rotational direction of the photoconductor 62. The developing device 70 visualizes the electrostatic latent image on the surface of the photoconductor 62 by developing the electrostatic latent image with toner of each color.

Figure 3:
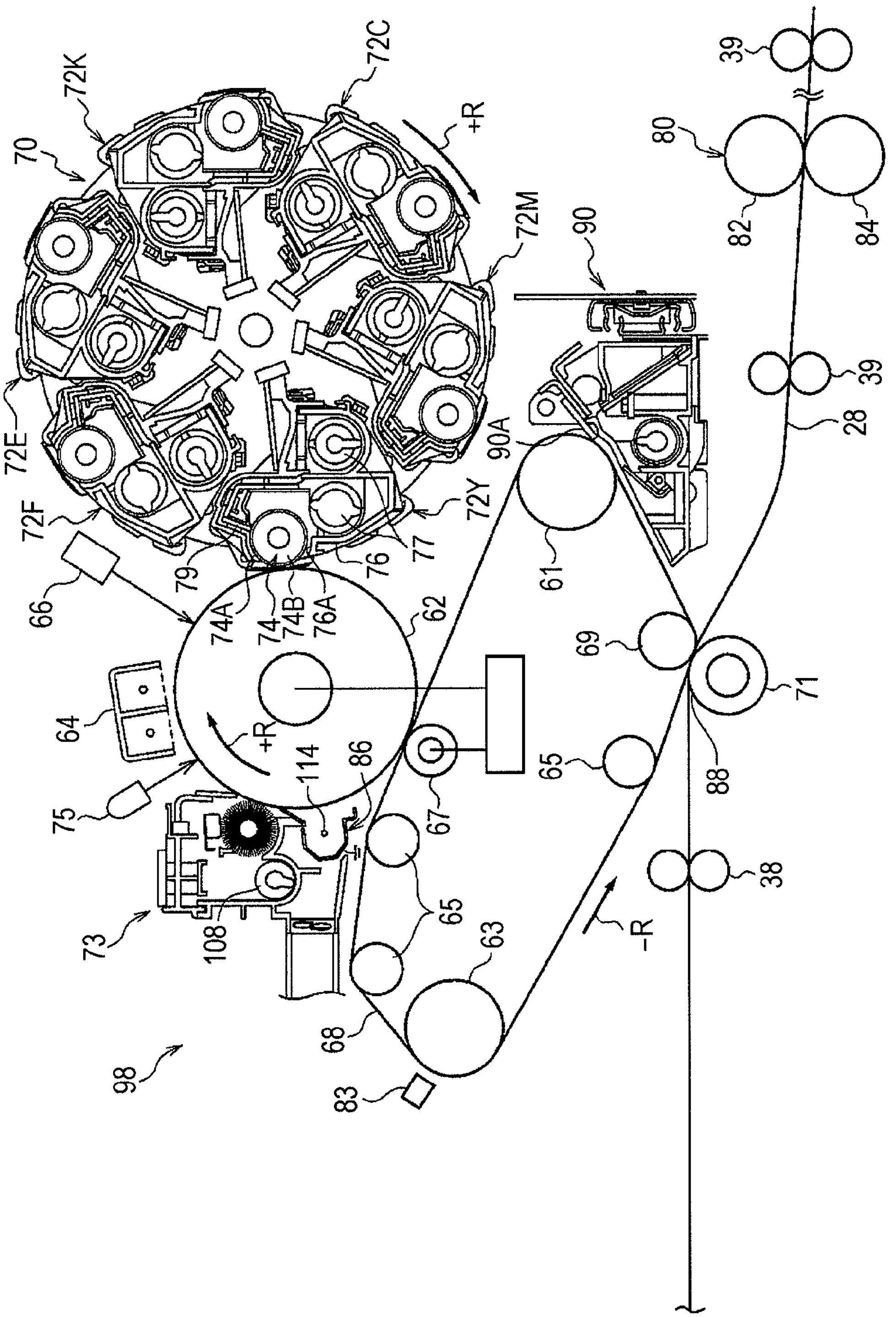
FIG. 3 illustrates a developing device, a photoconductor, an intermediate transfer belt, etc. included in the image forming apparatus according to the first exemplary embodiment of the present invention.

As illustrated in FIG. 3, the developing device 70 includes developing units 72Y, 72M, 72C, 72K, 72E, and 72F corresponding to the respective colors, which are yellow (Y), magenta (M), cyan (C), black (K), the first specific color (E), and the second specific color (F), respectively. The developing units 72Y, 72M, 72C, 72K, 72E, and 72F are arranged in that order in a circumferential (counterclockwise) direction. The developing device 70 is rotated by a motor (not shown), which is an example of a rotating unit, in steps of 60°. Accordingly, one of the developing units 72Y, 72M, 72C, 72K, 72E, and 72F that is to perform a developing process is selectively opposed to the surface of the photoconductor 62. The developing units 72Y, 72M, 72C, 72K, 72E, and 72F have similar structures. Therefore, only the developing unit 72Y will be described, and explanations of the other developing units 72M, 72C, 72K, 72E, and 72F will be omitted.

The developing unit 72Y includes a casing member 76, which serves as a base body. The casing member 76 is filled with developer (not shown) including toner and carrier. The developer is supplied from a toner cartridge 78Y (see FIG. 4) through a toner supply channel (not shown). The casing member 76 has a rectangular opening 76A that is opposed to the surface of the photoconductor 62. A developing roller 74 is disposed in the opening 76A such that the surface thereof is opposed to the surface of the photoconductor 62. A plate-shaped regulating member 79, which regulates the thickness of a developer layer, is provided along the longitudinal direction of the opening 76A at a position near the opening 76A in the casing member 76.

The developing roller 74 includes a rotatable cylindrical developing sleeve 74A and a magnetic unit 74B fixed to the inner surface of the developing sleeve 74A. The magnetic unit 74B includes plural magnetic poles. A magnetic brush made of the developer (carrier) is formed as the developing sleeve 74A is rotated, and the thickness of the magnetic brush is regulated by the regulating member 79. Thus, the developer layer is formed on the surface of the developing sleeve 74A. The developer layer on the surface of the developing sleeve 74A is moved to the position where the developing sleeve 74A faces the photoconductor 62. Accordingly, the toner adheres to the latent image (electrostatic latent image) formed on the surface of the photoconductor 62. Thus, the latent image is developed.

Two helical transport augers 77 are rotatably arranged in parallel to each other in the casing member 76. The two transport augers 77 rotate so as to circulate the developer contained in the casing member 76 in the axial direction of the developing roller 74 (longitudinal direction of the developing unit 72Y). Six developing rollers 74 are included in the respective developing units 72Y, 72M, 72C, 72K, 72E, and 72F, and are arranged along the circumferential direction so as to be separated form each other by 60° in terms of the central angle. When the developing units 72 are switched, the developing roller 74 in the newly selected developing unit 72 is caused to face the surface of the photoconductor 62.

An intermediate transfer belt 68, which is an example of an image carrier, is provided downstream of the developing device 70 in the rotational direction of the photoconductor 62 and below the photoconductor 62. A toner image formed on the surface of the photoconductor 62 is transferred onto the intermediate transfer belt 68. The intermediate transfer belt 68 is an endless belt, and is wound around a driving roller 61 that is rotated by the controller 20, a tension-applying roller 63 that applies a tension to the intermediate transfer belt 68, plural transport rollers 65 that are in contact with the back surface of the intermediate transfer belt 68 to be rotationally driven, and an auxiliary roller 69 that is in contact with the back surface of the intermediate transfer belt 68 to be rotationally driven. The intermediate transfer belt 68 is rotated in the direction shown by arrow –R (counterclockwise in FIG. 4) when the driving roller 61 is rotated.

A first transfer roller 67 is opposed to the photoconductor 62 with the intermediate transfer belt 68 interposed therebetween. The first transfer roller 67 performs a first transfer process in which the toner image formed on the surface of the photoconductor 62 is transferred onto the intermediate transfer belt 68. The first transfer roller 67 is in contact with the back surface of the intermediate transfer belt 68 at a position downstream of the position where the photoconductor 62 is in contact with the intermediate transfer belt 68 in the moving direction of the intermediate transfer belt 68. The first transfer roller 67 receives electricity from a power source (not shown), so that a potential difference is generated between the first transfer roller 67 and the photoconductor 62, which is grounded. Thus, the first transfer process is carried out in which the toner image on the photoconductor 62 is transferred onto the intermediate transfer belt 68.

A second transfer roller 71, which is an example of a transfer member, is opposed to the auxiliary roller 69 with the intermediate transfer belt 68 interposed therebetween. The second transfer roller 71 performs a second transfer process in which toner images that have been transferred onto the intermediate transfer belt 68 in the first transfer process are transferred onto the sheet member P. The position between the second transfer roller 71 and the auxiliary roller 69 serves as the second transfer position 88 at which the toner images are transferred onto the sheet member P.

More specifically, the second transfer roller 71 causes the sheet member P transported by the positioning rollers 38 to pass between the second transfer roller 71 and the intermediate transfer belt 68 while the second transfer roller 71 is in contact with the intermediate transfer belt 68 so as to be rotated by the intermediate transfer belt 68. Accordingly, the toner images formed on the intermediate transfer belt 68 are transferred onto the sheet member P. The second transfer roller 71 is grounded, and a bias voltage is applied to a shaft of an auxiliary roller 69 by a power source (not shown), so that a potential dereference is generated between the auxiliary roller 69 and the second transfer roller 71, which is grounded. Thus, the second transfer process is carried out in which the toner images on the intermediate transfer belt 68 are transferred onto the sheet member P.

A cleaning device 90 including a blade 90A is opposed to the driving roller 61 with the intermediate transfer belt 68 interposed therebetween. The blade 90A removes residual toner that remains on the intermediate transfer belt 68 after the second transfer process.

A position detection sensor 83 is opposed to the tension-applying roller 63 at a position outside the intermediate transfer belt 68. The position detection sensor 83 detects a predetermined reference position on the surface of the intermediate transfer belt 68 by detecting a mark (not shown) on the intermediate transfer belt 68. The position detection sensor 83 outputs a position detection signal that serves as a reference for the time to start an image forming process.

An adjusting charger 86, which is an example of a corotron charger, is provided downstream of the first transfer roller 67 in the rotational direction of the photoconductor 62. The adjusting charger 86 adjusts the charge potential of the surface of the photoconductor 62 by negatively charging the photoconductor 62. A cleaning device 73 is provided downstream of the adjusting charger 86 in the rotational direction of the photoconductor 62. The cleaning device 73 removes residual toner and the like that remain on the surface of the photoconductor 62 instead of being transferred onto the intermediate transfer belt 68 in the first transfer process. The adjusting charger 86 and the cleaning device 73 form a cleaning structure 98.

An erase device 75 is provided downstream of the cleaning device 73 and upstream of the charging member 64 in the rotational direction of the photoconductor 62. The erase device 75 removes the electric charge by irradiating the surface of the photoconductor 62 with light.

As illustrated in FIG. 4, the second transfer position 88 at which the toner images are transferred onto the sheet member P by the second transfer roller 71 is at an intermediate position of the above-described transport path 28. A fixing device 80 is provided on the transport path 28 at a position downstream of the second transfer roller 71 in the transport direction of the sheet member P (direction shown by arrow A). The fixing device 80 fixes the toner images that have been transferred onto the sheet member P by the second transfer roller 71.

The fixing device 80 includes a heating roller 82 and a pressing roller 84. The heating roller 82 is disposed at the side of the sheet member P at which the toner images are formed (upper side), and includes a heat source which generates heat when electricity is supplied thereto. The pressing roller 84 is positioned below the heating roller 82, and presses the sheet member P against the surface of the heating roller 82. Plural pairs of transport rollers 39, which are examples of transport members that transport the sheet member P, are provided on the transport path 28.

Toner cartridges 78Y, 78M, 78C, 78K, 78E, and 78F that respectively contain yellow (Y) toner, magenta (M) toner, cyan (C) toner, black (K) toner, toner of a first specific color (E), and toner of a second specific color (F) are arranged next to each other in the horizontal direction in a replaceable manner in an area below the original-document reading device 56 and above the developing device 70. The first and second specific colors E and F may be selected from specific colors (including transparent) other than yellow, magenta, cyan, and black. Alternatively, the first and second specific colors E and F are not selected. When the first and second specific colors E and F are selected, the developing device 70 performs the image forming process using six colors, which are Y, M, C, K, E, and F. When the first and second specific colors E and F are not selected, the developing device 70 performs the image forming process using four colors, which are Y, M, C, and K. In the present exemplary embodiment, the case in which the image forming process is performed using the four colors, which are Y, M, C, and K, and the first and second specific colors E and F are not used will be described as an example. However, as another example, the image forming process may be performed using five colors, which are Y, M, C, K, and one of the first and second specific colors E and F.

Figure 2:
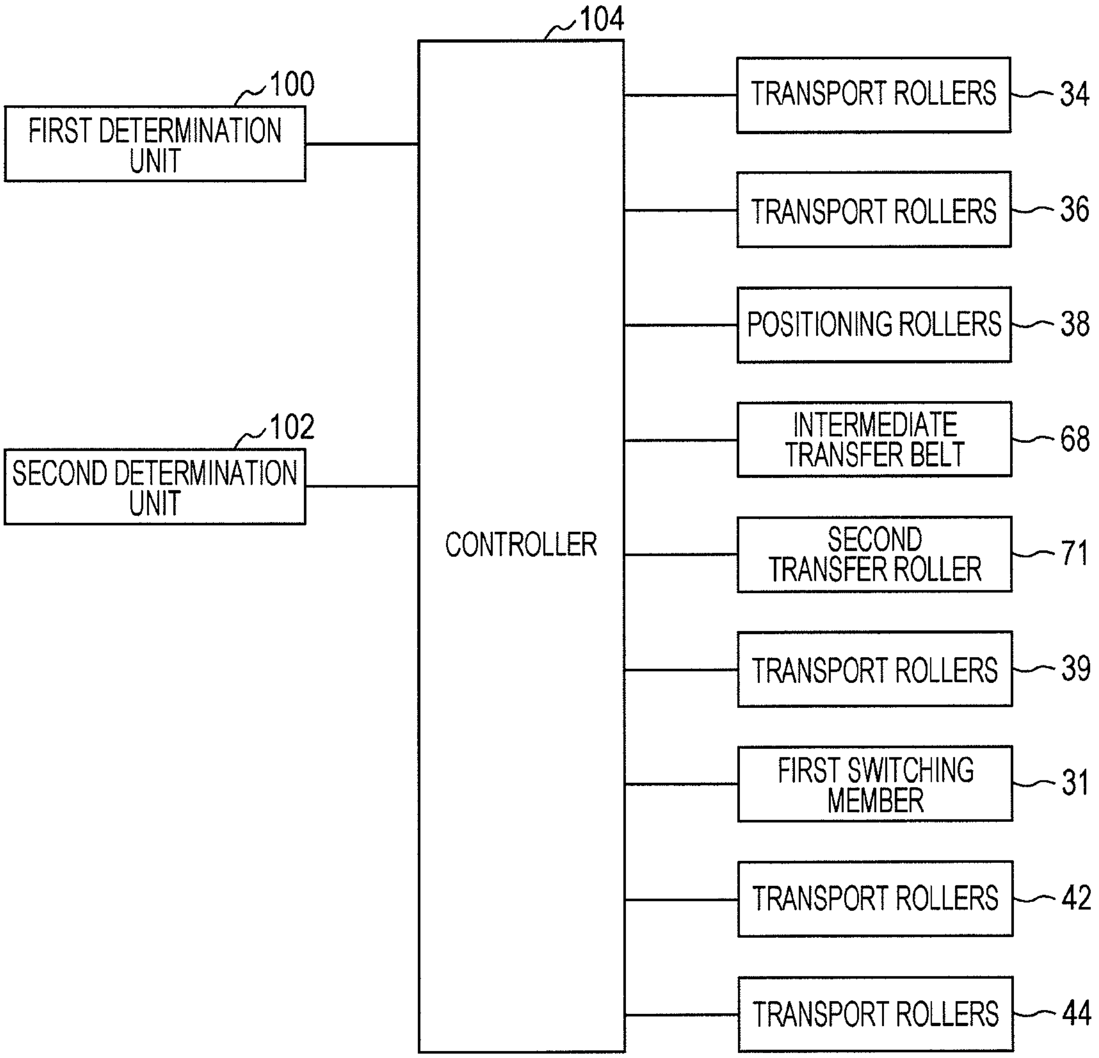
FIG. 2 is a block diagram illustrating communication between a first determination unit, a second determination unit, the controller, etc., included in the image forming apparatus according to the first exemplary embodiment of the present invention.

Referring to FIG. 2, the image forming apparatus 10 includes a first determination unit 100 that determines whether or not the toner images transferred onto the sheet members P are borderless images on the basis of the image data of each color output to the exposure device 66.

The image forming apparatus 10 further includes a second determination unit 102 and a controller 104. The second determination unit 102 determines whether or not the sheet member P has burrs at edge portions thereof. The controller 104 controls each member so as to control the operation of transporting the sheet members P and the time at which the toner images are transferred on the basis of the determination results obtained by the first and second determination units 100 and 102.

The first determination unit 100, the second determination unit 102, and the controller 104 will be described in detail below.

The case in which the toner images transferred onto the sheet members P are not borderless images will be considered. In this case, referring to FIG. 4, when the image forming apparatus 10 is activated, image data of respective colors, which are yellow (Y), magenta (M), cyan (C), and black (K), are successively output to the exposure device 66 from an image processing device (not shown) or an external device. At this time, the developing device 70 is held such that the developing unit 72Y, for example, is opposed to the surface of the photoconductor 62 (see FIG. 3). The blade 90A in the cleaning device 90 and the second transfer roller 71 are separated from the surface of the intermediate transfer belt 68 until the toner images of the respective colors are transferred onto the intermediate transfer belt 68 in a superimposed manner in the first transfer process.

The exposure device 66 emits light in accordance with the image data, and the surface of the photoconductor 62, which has been charged by the charging member 64, is exposed to the emitted light. Accordingly, an electrostatic latent image corresponding to the yellow image data is formed on the surface of the photoconductor 62. The electrostatic latent image formed on the surface of the photoconductor 62 is developed as a yellow toner image by the developing unit 72Y. The yellow toner image on the surface of the photoconductor 62 is transferred onto the intermediate transfer belt 68 by the first transfer roller 67.

Subsequently, the developing device 70 is rotated by 60° in the direction shown by arrow +R, so that the developing unit 72M is opposed to the surface of the photoconductor 62. Then, the charging process, the exposure process, and the developing process are performed so that a magenta toner image is formed on the surface of the photoconductor 62. The magenta toner image is transferred onto the yellow toner image on the intermediate transfer belt 68 by the first transfer roller 67. Similarly, cyan (C) and black (K) toner images are successively transferred onto the intermediate transfer belt 68 in a superimposed manner. After the toner images have been transferred onto the intermediate transfer belt 68, the blade 90A of the cleaning device 90 and the second transfer roller 71 come into contact with the surface of the intermediate transfer belt 68.

A sheet member P is fed from the storage unit 12 and transported along the transport path 28. Then, the sheet member P is transported by the positioning rollers 38 to the second transfer position 88 in time with the transferring of the toner images onto the intermediate transfer belt 68 in a superimposed manner. Then, the second transfer process is performed in which the toner images that have been transferred onto the intermediate transfer belt 68 in a superimposed manner are transferred by the second transfer roller 71 onto the sheet member P that has been transported to the second transfer position 88. The residual toner that remains on the surface of the intermediate transfer belt 68 is removed from the intermediate transfer belt 68 by the blade 90A and collected.

The sheet member P onto which the toner images have been transferred is transported toward the fixing device 80 in the direction shown by arrow A (rightward in FIG. 4). The fixing device 80 fixes the toner images to the sheet member P by applying heat and pressure thereto with the heating roller 82 and the pressing roller 84. The sheet member P to which the toner images have been fixed is ejected to, for example, the paper output unit 15. When images are to be formed on both sides of the sheet member P, the following process is performed. That is, after the toner images on the front surface of the sheet member P are fixed by the fixing device 80, the sheet is transported to the reversing unit 33 in the direction shown by arrow −V. Then, the sheet member P is transported in the direction shown by arrow +V, so that the leading and trailing edges of the sheet member P are reversed. Then, the sheet member P is transported along the duplex-printing transport path 29 in the direction shown by arrow B (leftward in FIG. 4), and is guided into the transport path 28. Then, the back surface of the sheet member P is subjected to the image forming process and the fixing process in a manner similar to the front surface.

Structure of Relevant Part

The structures of the first determination unit 100, the second determination unit 102, and the controller 104 will now be described.

Referring to FIG. 2, the image forming apparatus 10 includes the first determination unit 100 that determines whether or not the toner images transferred onto the sheet members P are borderless images on the basis of the image data of each color output to the exposure device 66 (see FIG. 4).

Here, the borderless images are toner images that do not leave a border (margin) at any of the edges of the sheet member P when the toner images are transferred onto the sheet member P. In other words, the borderless images are not limited to the toner images that do not leave borders at all sides (the four sides) of the sheet member P.

In addition, the second determination unit 102 is provided to determine whether or not the sheet member P has burrs at the edge portions thereof. In the present exemplary embodiment, for example, a user operates an operation screen (not shown) provided on the image forming apparatus 10 to input whether or not the sheet member P has burrs at the edges thereof. Accordingly, the second determination unit 102 determines whether or not the sheet member P has burrs at the edge portions thereof.

The structure and operation of the controller 104 will be described below.

Operation of Relevant Part

The operation of the relevant part will now be explained together with the control operation performed by the controller 104 in the image forming apparatus 10. The control operation of the controller 104 will be described with reference to the flowchart of FIG. 1.

Figure 1:
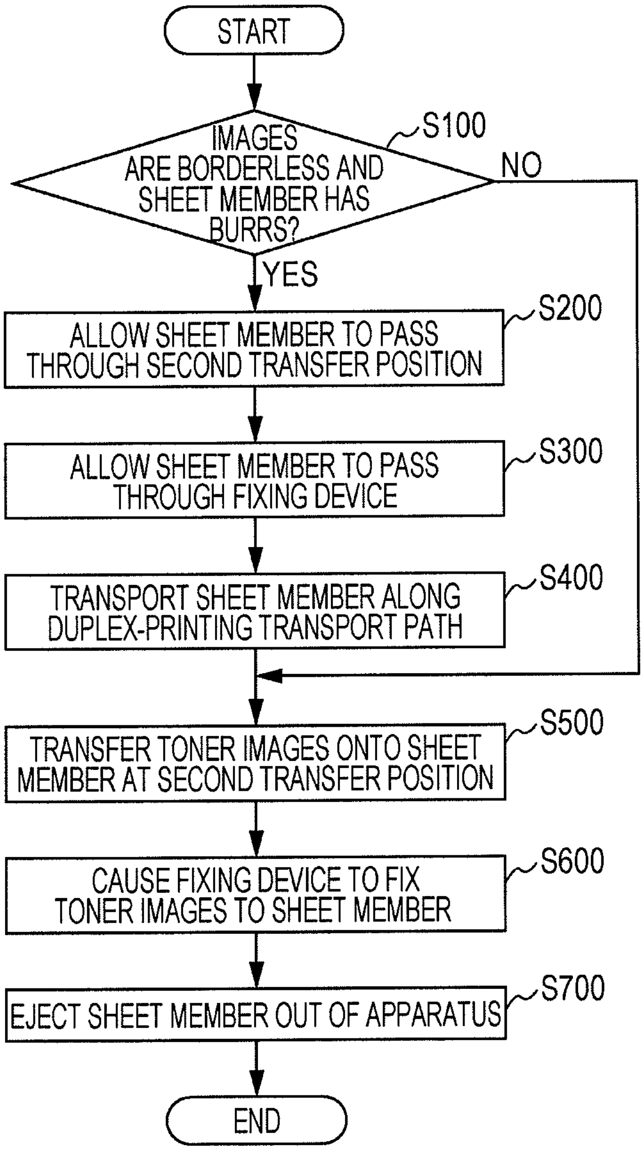
FIG. 1 is a flowchart of a control process performed by a controller included in an image forming apparatus according to a first exemplary embodiment of the present invention.

Referring to FIG. 1, when the image forming apparatus 10 is activated, first, in step S100, the first determination unit 100 determines whether or not the toner images transferred onto the sheet members P are borderless images on the basis of the image data of each color output to the exposure device 66 (see FIG. 4).

In addition, the second determination unit 102 determines whether or not the sheet member P has burrs at the edge portions thereof on the basis of the information input by the user, the information representing the presence/absence of burrs on the sheet member P input by the user.

If it is determined by the first and second determination units 100 and 102 that the toner images transferred onto the sheet member P are borderless images and that the sheet member P has burrs at the edge portions thereof, the process proceeds to step S200.

In step S200, the controller 104 controls the transport rollers 34 and 36 and the positioning rollers 38 (see FIG. 2). Accordingly, the sheet member P passes through the second transfer position 88 (position between the intermediate transfer belt 68 and the second transfer roller 71 (see FIG. 3)) before the toner images are formed on the intermediate transfer belt 68. After the sheet member P has passed through the second transfer position 88, the process proceeds to step S300.

In step S300, the controller 104 controls the transport rollers 39 (see FIG. 2). Accordingly, the sheet member P that has no toner images transferred thereon is caused to pass through the fixing device 80 (see FIG. 3). Then, the process proceeds to step S400.

In step S400, the controller 104 controls the first switching member 31 and the transport rollers 42 and 44 (see FIG. 2). Accordingly, the sheet member P that has no toner images transferred thereon is transported to the duplex-printing transport path 29, so that the sheet member P is reversed (see FIG. 3). In addition, the toner images are formed on the intermediate transfer belt 68, and the process proceeds to step S500.

In step S500, the controller 104 controls the positioning rollers 38, the intermediate transfer belt 68, and the second transfer roller 71 (see FIG. 2). Accordingly, the sheet member P passes through the second transfer position 88, and the toner images formed on the intermediate transfer belt 68 are transferred onto the sheet member P (see FIG. 3). Then, the process proceeds to step S600.

In step S600, the controller 104 controls the transport rollers 39 (see FIG. 2). Accordingly, the sheet member P passes through the fixing device 80 and the toner images on the sheet member P are fixed (see FIG. 3). Then, the process proceeds to step S700.

In step S700, the sheet member P to which the toner images have been fixed is output to the paper output unit 15.

In step S100, if is determined by the first and second determination units 100 and 102 that the toner images transferred onto the sheet member P are not the borderless images and/or that the sheet member P has no burrs at the edge portions thereof, the process proceeds to steps S500, S600, and S700. Accordingly, the toner images are transferred onto the sheet member P, and the sheet member P to which the toner images have been fixed is ejected to the paper output unit 15.

As described above, when the toner images transferred onto the sheet member P are borderless images and the sheet member P has burrs at the edge portions thereof, the sheet member P is caused to pass through the second transfer position 88 and the fixing device 80 before the toner images are transferred onto the sheet member P. Accordingly, the burrs at the edge portions of the sheet member P may be removed (smashed) without causing an increase in the size of the apparatus.

Since the burrs at the edge portions of the sheet member P may be removed (smashed), even when the toner images transferred onto the sheet member P are borderless images, unevenness in density of the toner images at the edges of the sheet member P may be reduced.

Second Exemplary Embodiment

An example of an image forming apparatus according to a second exemplary embodiment of the present invention will now be described. Components similar to those of the first exemplary embodiment are denoted by the same reference numerals, and explanations thereof are thus omitted.

If it is determined by the first and second determination units 100 and 102 that the toner images transferred onto the sheet member P are borderless images and that the sheet member P has burrs at the edge portions thereof, the controller 104 according to the second exemplary embodiment controls the transport rollers 34, 36, 39, 42, and 44. Accordingly, a preliminary transport speed at which the sheet member P is transported until the toner images are transferred onto the sheet member P (transfer speed in steps S200 to S400) is set to be higher than a transferring transport speed at the time when the toner images are transferred onto the sheet member P (transfer speed in step S500).

In this case, compared to the case in which the preliminary transport speed is equal to the transferring transport speed, reduction in the yield may be suppressed.

Other operations are similar to those in the first exemplary embodiment.

Third Exemplary Embodiment

An example of an image forming apparatus according to a third exemplary embodiment of the present invention will now be described with reference to FIGS. 5 to 7. Components similar to those of the first exemplary embodiment are denoted by the same reference numerals, and explanations thereof are thus omitted.

Figure 7:
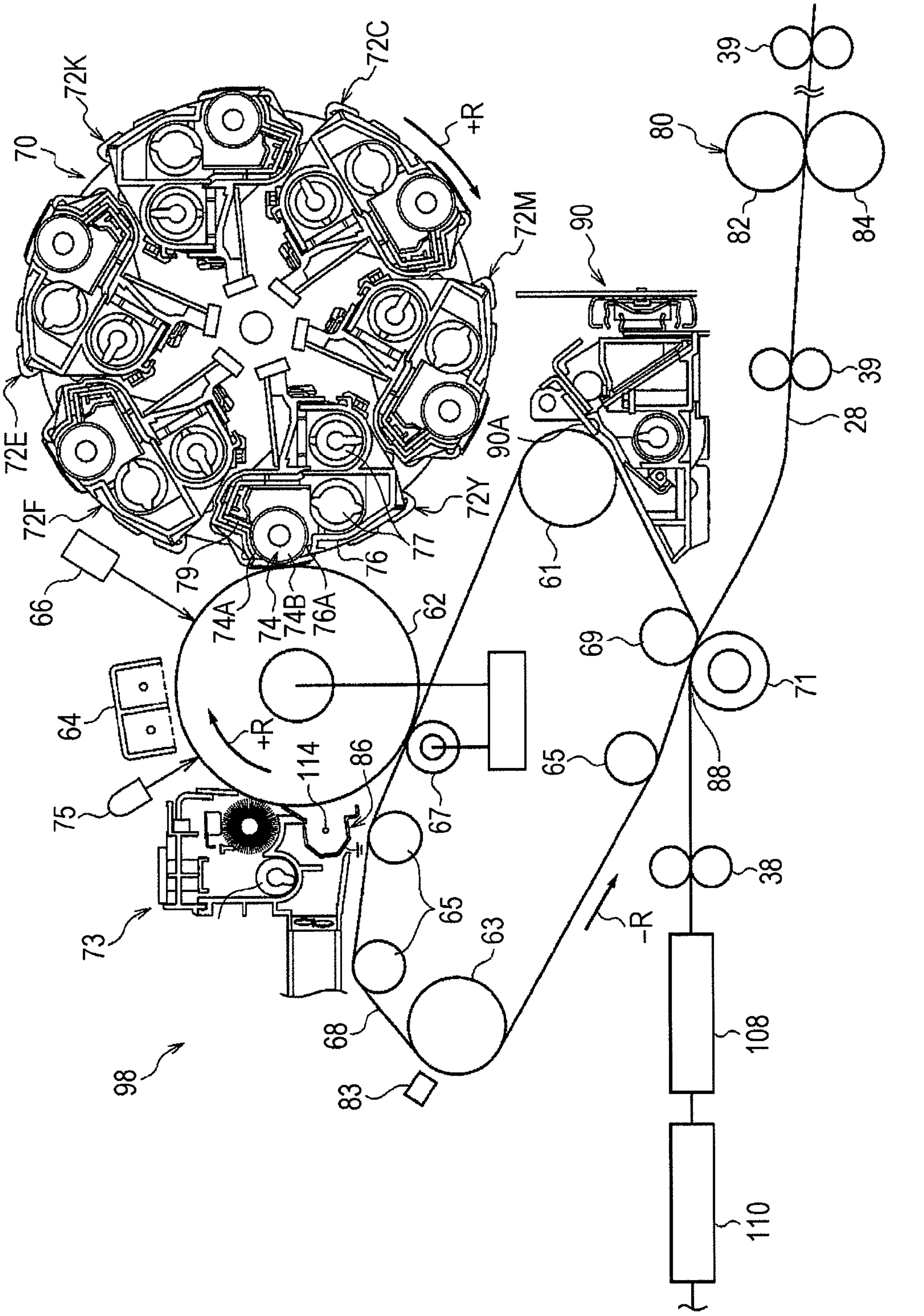
FIG. 7 illustrates a developing device, a photoconductor, an intermediate transfer belt, etc. included in the image forming apparatus according to the third exemplary embodiment of the present invention.

Referring to FIG. 7, a first position changing device 108 and a second position changing device 110 are provided upstream of the positioning rollers 38 in the transport direction of the sheet member P. The first and second position changing devices 108 and 110 are examples of position changing units that change the transport position of the sheet member P in the width direction thereof.

Figure 6:
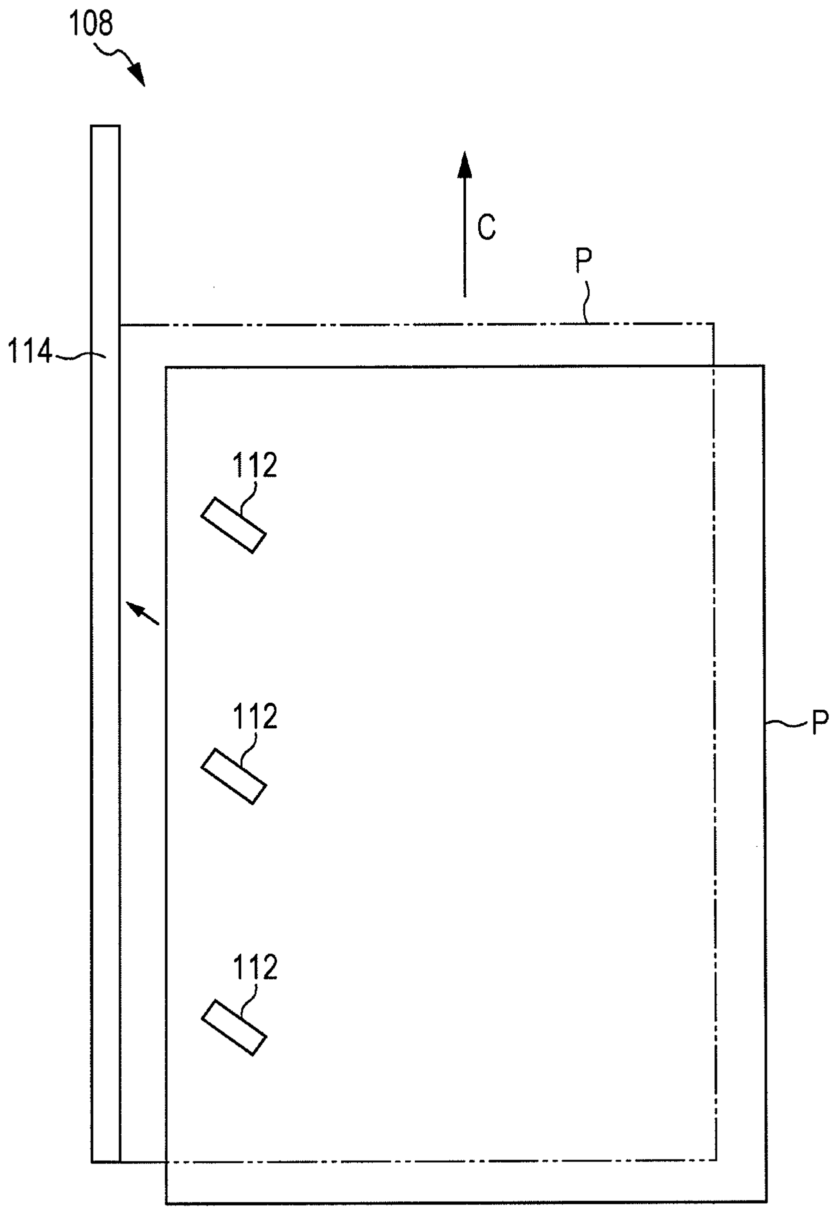
FIG. 6 is a plan view of a first position changing device included in the image forming apparatus according to the third exemplary embodiment of the present invention.

As illustrated in FIG. 6, the first position changing device 108 includes three inclined rollers 112 and a reference guide 114. The inclined rollers 112 are inclined toward the left side in FIG. 6 with respect to the transport direction of the sheet member P (direction shown by arrow C). The reference guide 114 serves as a reference of the transport position of the sheet member P in the width direction of the sheet member P (direction orthogonal to or substantially orthogonal to the transport direction of the sheet member P).

The inclined rollers 112 are inclined so as to obliquely transport the sheet member P toward the reference guide 114. The reference guide 114 extends in the transport direction, and defines the transport position of the sheet member P when the left edge of the sheet member P that is being transported comes into contact with the reference guide 114. Thus, the transport position of the sheet member P is corrected by the first position changing device 108 so that the toner images may be transferred onto the sheet member P at the second transfer position 88.

Figure 5:
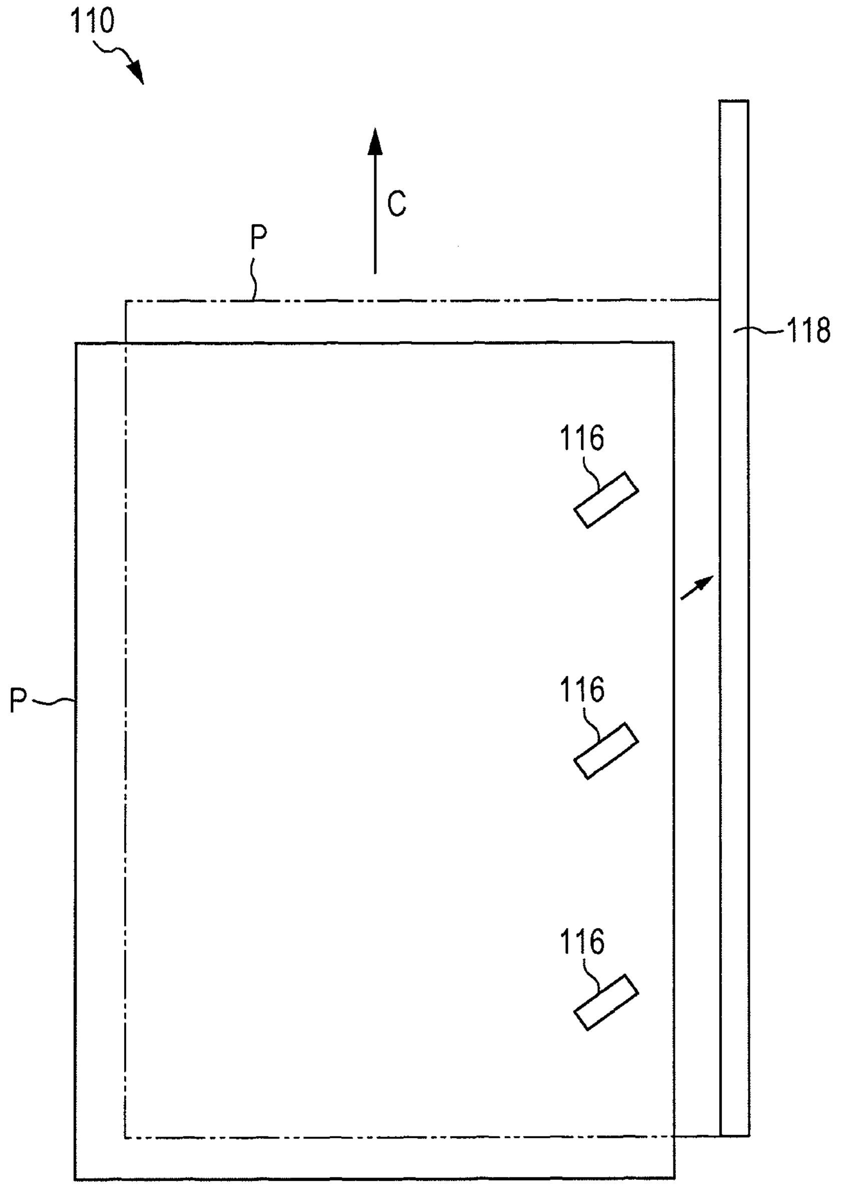
FIG. 5 is a plan view of a second position changing device included in an image forming apparatus according to a third exemplary embodiment of the present invention.

As illustrated in FIG. 5, the second position changing device 110 includes three inclined rollers 116 and a reference guide 118. The inclined rollers 116 are inclined toward the right side in FIG. 5 with respect to the transport direction of the sheet member P (direction shown by arrow C). The reference guide 118 serves as a reference of the transport position of the sheet member P in the width direction of the sheet member P.

The inclined rollers 116 are inclined so as to obliquely transport the sheet member P toward the reference guide 118. The reference guide 118 extends in the transport direction, and defines the transport position of the sheet member P when the right edge of the sheet member P that is being transported comes into contact with the reference guide 118.

With the above-described structure, the controller 104 controls the second position changing device 110 so as to change the transport position of the sheet member P in the preliminary transporting process performed before the toner images are transferred onto the sheet member P. More specifically, the transport position of the sheet member P is changed from the transferring transport position at which the toner images are transferred onto the sheet member P at the second transfer position 88.

Subsequently, the controller 104 controls the first position changing device 108 so as to correct the transport position of the sheet member P that has been changed by the second position changing device 110. Accordingly, the toner images may be transferred onto the sheet member P at the second transfer position 88. Then, the toner images are transferred onto the sheet member P after the transport position thereof is corrected to the transferring transport position.

When the transport position of the sheet member P in the preliminary transport process is changed as described above, scratch marks formed when the burrs on the sheet member P are transported may be prevented from being concentrated in a certain area.

Since the scratch marks formed when the burrs on the sheet member P are transported may be prevented from being concentrated in a certain area, durability of the image forming apparatus 10 may be increased.

Other operations are similar to those in the first exemplary embodiment.

Fourth Exemplary Embodiment

An example of an image forming apparatus according to a fourth exemplary embodiment of the present invention will now be described. Components similar to those of the first exemplary embodiment are denoted by the same reference numerals, and explanations thereof are thus omitted.

If it is determined by the first and second determination units 100 and 102 that the toner images transferred onto the sheet member P are borderless images and that the sheet member P has burrs at the edge portions thereof, the controller 104 according to the fourth exemplary embodiment controls the intermediate transfer belt 68 and the second transfer roller 71 so as to set a borderless-printing transferring condition for transferring the toner images on the sheet member to be the same as a back-surface transferring condition for transferring the toner images on the back surface of the sheet member P in duplex printing.

Thus, the toner images are transferred onto the sheet member P under a transferring condition that is suitable for the sheet member P that has passed through and heated by the fixing device 80. In this case, the quality of the output image may be improved compared to the case in which the transferring condition is the same as that in one-sided printing.

Other operations are similar to those in the first exemplary embodiment.

Although specific exemplary embodiments of the present invention are described above, the present invention is not limited to the above-described exemplary embodiments. It is clear to those skilled in the art that various embodiments are possible within the scope of the present invention. For example, although not explained in the above-described exemplary embodiments, the controller 104 may control the transporting process of the sheet member P in accordance with, for example, the type of the sheet member P, the humidity of the room in which the image forming apparatus 10 is installed, or the image conditions at the end of the sheet member P.

In addition, although not explained in the above-described exemplary embodiments, the nipping force applied by the fixing device, for example, may be changed in accordance with the amount of burrs on the sheet member P.

The amount of burrs may be detected by setting a burr detection mode in the image forming apparatus 10. In the burr detection mode, an image in a color in which the unevenness in density at the edges of the sheet member P may be easily recognized (for example, a solid blue image) is formed at the edges of the sheet member P. Then, the user may determine the amount of burrs by observing the ejected sheet member P. Alternatively, the amount of burrs may be automatically determined by a detection member arranged on a sheet transport path along which the sheet member P is transported after the transferring process. For example, it may be determined that there are burrs when the density is not higher than a certain threshold.

In the above-described third exemplary embodiment, the reference guide 118 is fixed at a certain position. However, the reference guide may instead be configured to be movable in the width direction of the sheet member P and stopped at plural positions. In this case, the transport position of the sheet member P may be changed to plural positions in the preliminary transporting process before the toner images are transferred onto the sheet member P. Therefore, the scratch marks formed when the burrs on the sheet member P are transported may be effectively prevented from being concentrated in a certain area.

In addition, in the above-described exemplary embodiments, the user inputs the presence/absence of burrs on the sheet member P in the image forming apparatus 10, and the controller 104 determines the presence/absence of the burrs accordingly. However, the controller 104 may determine that there are no burrs by performing steps S200 to S400 first.

In the above-described exemplary embodiments, the burrs are removed by causing the sheet member P to pass through the second transfer position 88 and the fixing device 80 before the toner images are transferred onto the sheet member P. However, the burrs on the sheet member P may be removed (smashed) by at least one of the second transfer position 88 and the fixing device 80.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a transport member that transports a recording medium;

an image carrier that rotates while carrying a toner image on a surface thereof;

a transfer member that transfers the toner image carried by the image carrier onto the recording medium by causing the recording medium, which is transported by the transport member, to pass between the transfer member and the image carrier while the transfer member is in contact with the image carrier so as to be rotated by the image carrier;

a fixing device that is disposed downstream of the image carrier in a transport direction of the recording medium and that fixes the toner image to the recording medium by nipping the recording medium onto which the toner image has been transferred;

a reversing path that reverses front and back sides of the recording medium that has passed between the image carrier and the transfer member and through the fixing device and then guides the recording medium to between the image carrier and the transfer member; and a controller that, when the toner image to be transferred onto the recording medium is a borderless image and there is a burr on an edge portion of the recording medium, controls the transport member, the image carrier, and the transfer member so that the recording medium passes between the image carrier and the transfer member and through the fixing device without the toner image being transferred onto the recording medium, and then the recording medium is transported along the reversing path to between the image carrier and the transfer member and the toner image is transferred onto the recording medium.

2. The image forming apparatus according to claim 1, wherein, when the toner image to be transferred onto the recording medium is a borderless image and there is a burr on an edge portion of the recording medium, the controller controls the transport member so as to set a preliminary transport speed at which the recording medium is transported before the toner image is transferred onto the recording medium to a speed higher than a transferring transport speed at which the recording medium is transported when the toner image is transferred onto the recording medium.

3. The image forming apparatus according to claim 1, further comprising:

a position changing unit that changes a transport position of the recording medium in a width direction of the recording medium, the width direction being substantially orthogonal to the transport direction of the recording medium, wherein, when the toner image to be transferred onto the recording medium is a borderless image and there is a burr on an edge portion of the recording medium, the controller controls the position changing unit so as to change a preliminary transport position for a preliminary transporting process in which the recording medium is transported before the toner image is transferred onto the recording medium from a transferring transport position for when the toner image is transferred onto the recording medium.

4. The image forming apparatus according to claim 2, further comprising:

a position changing unit that changes a transport position of the recording medium in a width direction of the recording medium, the width direction being substantially orthogonal to the transport direction of the recording medium, wherein, when the toner image to be transferred onto the recording medium is a borderless image and there is a burr on an edge portion of the recording medium, the controller controls the position changing unit so as to change a preliminary transport position for a preliminary transporting process in which the recording medium is transported before the toner image is transferred onto the recording medium from a transferring transport position for when the toner image is transferred onto the recording medium.

5. The image forming apparatus according to claim 1, wherein, when the toner image to be transferred onto the recording medium is a borderless image and there is a burr on an edge portion of the recording medium, the controller controls at least one of the image carrier and the transfer member to set a borderless-printing transferring condition for transferring the toner image onto the recording medium to be the same as a back-surface transferring condition for transferring the toner image on a back surface of the recording medium in duplex printing.

6. The image forming apparatus according to claim 2, wherein, when the toner image to be transferred onto the recording medium is a borderless image and there is a burr on an edge portion of the recording medium, the controller controls at least one of the image carrier and the transfer member to set a borderless-printing transferring condition for transferring the toner image onto the recording medium to be the same as a back-surface transferring condition for transferring the toner image on a back surface of the recording medium in duplex printing.

7. The image forming apparatus according to claim 3, wherein, when the toner image to be transferred onto the recording medium is a borderless image and there is a burr on an edge portion of the recording medium, the controller controls at least one of the image carrier and the transfer member to set a borderless-printing transferring condition for transferring the toner image onto the recording medium to be the same as a back-surface transferring condition for transferring the toner image on a back surface of the recording medium in duplex printing.

8. The image forming apparatus according to claim 4, wherein, when the toner image to be transferred onto the recording medium is a borderless image and there is a burr on an edge portion of the recording medium, the controller controls at least one of the image carrier and the transfer member to set a borderless-printing transferring condition for transferring the toner image onto the recording medium to be the same as a back-surface transferring condition for transferring the toner image on a back surface of the recording medium in duplex printing.

* * * * *